(12) United States Patent
Dunnebacke

(10) Patent No.: US 6,327,737 B1
(45) Date of Patent: Dec. 11, 2001

(54) OIL DIP STICK WIPER

(76) Inventor: Kevin D. Dunnebacke, 1179 Green Acres Rd., Joelton, TN (US) 37080

( * ) Notice: Subject to any disclaimer, the term of this patent is extended or adjusted under 35 U.S.C. 154(b) by 0 days.

(21) Appl. No.: 09/289,630

(22) Filed: Apr. 12, 1999

(51) Int. Cl.[7] .......................... A47L 25/00; F01M 11/12
(52) U.S. Cl. ........................ 15/220.4; 15/210.1
(58) Field of Search ................. 15/210.1, 209.1, 15/220.4, 227; 224/269, 932

(56) References Cited

U.S. PATENT DOCUMENTS

| | | | |
|---|---|---|---|
| 2,069,406 | * | 2/1937 | Esch .................................. 15/220.4 |
| 2,253,269 | * | 8/1941 | Gaddis ............................... 15/220.4 |
| 2,470,484 | * | 5/1949 | Gall .................................... 15/220.4 |
| 2,855,682 | * | 10/1958 | Norgard ............................ 15/220.4 |
| 2,968,825 | * | 1/1961 | Wetherby . | |
| 3,205,525 | * | 9/1965 | Birtzer ............................... 15/220.4 |
| 4,103,388 | * | 8/1978 | Devitis ............................... 15/220.4 |
| 4,516,616 | * | 5/1985 | Fesler ................................. 15/209.1 |
| 4,780,925 | * | 11/1988 | Sherman ............................ 15/220.4 |
| 5,444,890 | * | 8/1995 | Higginson ......................... 15/209.1 |
| 5,598,602 | * | 2/1997 | Gibson .............................. 15/220.4 |
| 6,000,103 | * | 12/1999 | Paice ................................. 224/269 |

* cited by examiner

Primary Examiner—Randall E. Chin
(74) Attorney, Agent, or Firm—Niro, Scavone Haller & Niro

(57) ABSTRACT

A dip-stick cleaner attachable to a dip-stick handle having an oil absorbent pad which is used to remove oil from a dip-stick. The apparatus also includes a clip having a first end and a second end with the first end of said clip including a latch having a handle which activates the latch between an open position and a closed position. The second end of the clip is adapted to rotatably connect the pad to said clip and the combination with the clip function as a handle for the removal of the dip-stick. Moreover, the clip is releasable from the dip-stick handle to allow the pad to be used to clean the dip-stick.

1 Claim, 1 Drawing Sheet

OIL DIP STICK WIPER

BACKGROUND OF THE INVENTION

The invention relates to an improved device for removing the oil from a dip-stick in order to accurately measure the amount of oil in an engine. More specifically, the present invention improves upon prior art devices by providing a device that is easier to use and also aids in locating the dip-stick itself.

SUMMARY OF THE INVENTION

The present invention improves upon prior oil removal devices—most of which require that the wiping device be affixed to a remote location on a vehicle. For example, U.S. Pat. No. 1,947,833 requires that the apparatus be attached to the exterior of a vehicle—a method that would not be tolerated by consumers today. In U.S. Pat. Nos. 4,103,388 and 5,598,602, wiping devices are disclosed that require the device to be attached to an air filter and to a dip stick tube, respectively. These devices present many disadvantages, including that the dip-stick needs to be positioned over the engine in order to use the device; the device requires that the user lean into the engine compartment to access the device; and in modern vehicles, the air filter and tube may not be in accessible locations.

The present invention overcomes the disadvantages of the prior art by providing an oil absorbent pad that is attached to the distal end of a clip that is adapted to releasably engage the end of the dip-stick. This allows a user to quickly find the dip-stick handle and remove it along with the cleaning device. Then, in an area outside of the engine compartment, the user may detach the device from the dip-stick and clean the oil off of the dip-stick with the attached absorbent pad.

DESCRIPTION OF A PREFERRED EMBODIMENT

Figure 1:
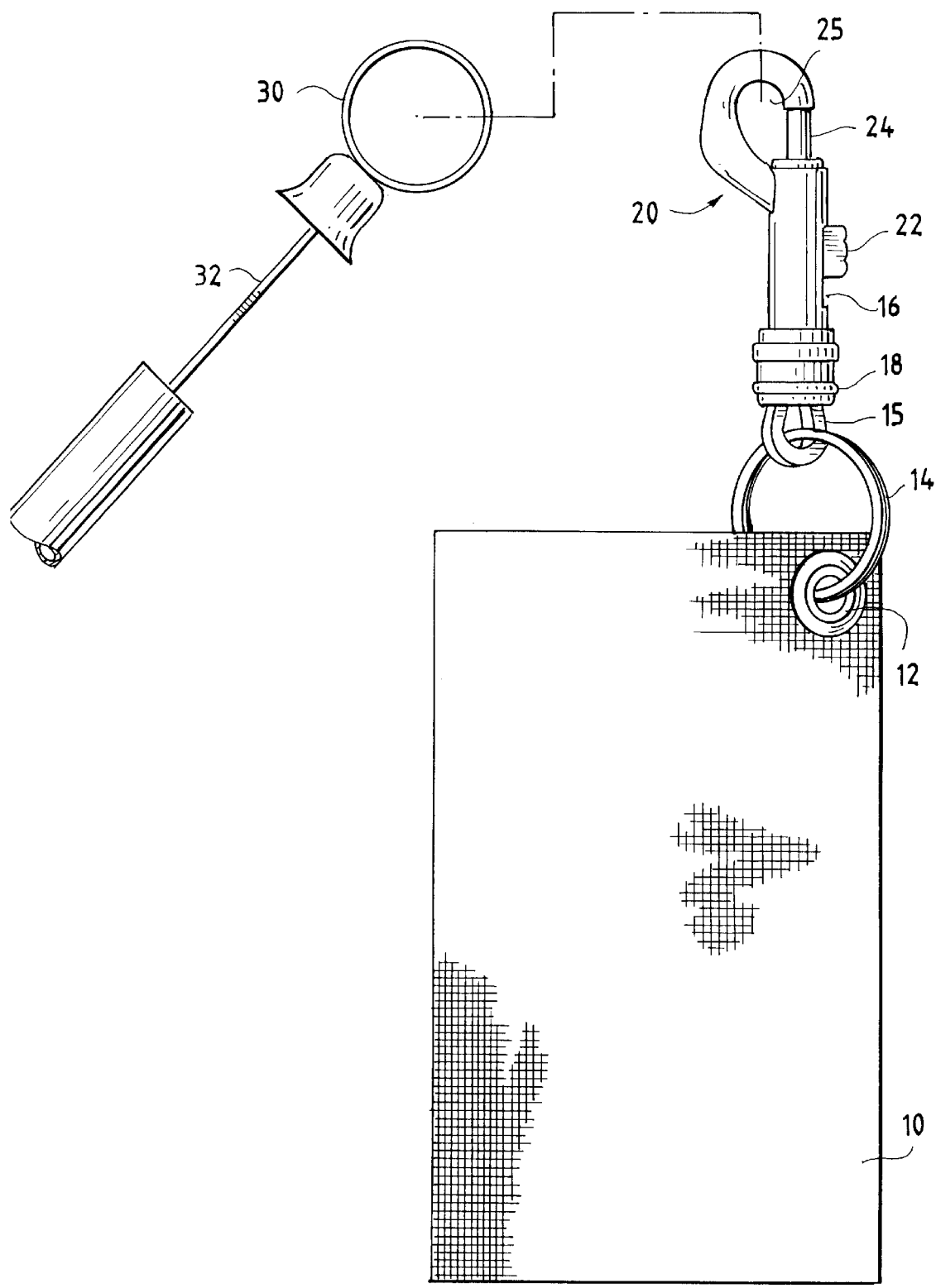
FIG. 1 is a perspective view of an embodiment of the present invention showing how the invention is releasably affixed to a dip-stick.

As shown if FIG. 1, the present invention includes a flame resistant, oil-absorbent pad 10, a grommet 12, a ring 14, and clip 16 with a rotatable distal end 18 adapted to receive ring 14 and a proximal end 20 that includes a releasable latch 24, including handle 22.

In use, proximal end 20 is affixed to a handle 30 of dip-stick 32 by depressing handle 22 which opens the latch so that handle 30 may be releasably secured within aperture 25. When a user desires to check the oil level in an engine, the invention is easily observed, even in low light levels, and grasped to facilitate the removal of the engine's dip-stick 32. In addition, as shown in FIG. 1, when affixed to a dip-stick, the device will typically hang in a downward direction. To facilitate its removal from a generally tight space in an engine compartment, the device is adapted to form multi-directional, articulating connection points by the use of rings 14 and 15, grommet 12, rotatable connection 18 and aperture 25. This inter-connected structure allows the invention to also function as an extended flexible handle for dip-stick 32.

Next, handle 22 is depressed to open latch 24, thus allowing the device to be removed from dip-stick 32 so that pad 10 may be used to wipe dip-stick 32 clean.

Thus, the present invention serves at least two beneficial functions. First, it provides an extended flexible handle that may be easily observed and grasped by a user in order to assist in the removal of a dip-stick 32. Second, it also provides an easy to use and always ready pad for cleaning dip-stick 32.

It should be understood that various changes and modifications to the preferred embodiments described would be apparent to those skilled in the art. For example, changes and modifications can be made without departing from the spirit and scope of the present invention and without diminishing its intended advantages. It is, therefore, intended that such changes and modifications be covered by the following claims.

What is claimed is:

1. In an engine compartment having a dip-stick with a handle for measuring the amount of oil in an engine and a device for cleaning the dip-stick, the device comprising:
   an oil absorbent pad for removing oil from a dip-stick;
   a clip having a first end and a second end;
   the first end of the clip including a latch having a handle which activates the latch between an open position and a closed position;
   the second end of the clip adapted to rotatably connect the clip to the pad; and
   wherein the pad in combination with the clip functions as a handle for removal of the dips stick and further wherein the clip is releasably attached to the dip-stick handle to allow the pad to be used to clean the dip-stick.

* * * * *